US011386456B1

(12) United States Patent
Lightbody et al.

(10) Patent No.: US 11,386,456 B1
(45) Date of Patent: Jul. 12, 2022

(54) MODIFICATION OF PRESENTED CONTENT BASED ON HISTORICAL DATA IN A SHOPPING MISSION

(71) Applicant: Amazon Technologies, Inc., Seattle, WA (US)

(72) Inventors: Jack Lightbody, Seattle, WA (US); Charles Lawrence Scott, Seattle, WA (US); Brett Patrick Canfield, Seattle, WA (US); Zheng Zheng Xing, Bellevue, WA (US); Daniel Lloyd, Seattle, WA (US); Soo-Min Pantel, Bellevue, WA (US); Byung Ju Lee, Sammamish, WA (US); Seong Jin Park, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/111,240

(22) Filed: Dec. 3, 2020

Related U.S. Application Data

(60) Provisional application No. 63/066,741, filed on Aug. 17, 2020.

(51) Int. Cl.
*G06Q 30/02* (2012.01)
*G06N 20/00* (2019.01)
*G06Q 30/06* (2012.01)

(52) U.S. Cl.
CPC ......... *G06Q 30/0256* (2013.01); *G06N 20/00* (2019.01); *G06Q 30/0253* (2013.01); *G06Q 30/0641* (2013.01)

(58) Field of Classification Search
CPC .................................................. G06Q 30/02
See application file for complete search history.

(56) References Cited

U.S. PATENT DOCUMENTS

| | | | | |
|---|---|---|---|---|
| 2010/0313141 | A1* | 12/2010 | Yu | G06Q 30/02 715/747 |
| 2014/0249885 | A1* | 9/2014 | Greenfield | G06Q 30/0625 705/7.29 |
| 2018/0144385 | A1* | 5/2018 | Subramanya | G06Q 30/0627 |
| 2018/0342003 | A1* | 11/2018 | Siddiqui | G06Q 30/0627 |

FOREIGN PATENT DOCUMENTS

WO   WO 2008/109485 A1 *   9/2008   ............. G06F 17/30

OTHER PUBLICATIONS

Method, system, and apparatus for automatic keyword recommendation based on individual user behavior (English)(United States)), The IP.com Prior Art Database, Aug. 26, 2008 (Year: 2008).*

* cited by examiner

*Primary Examiner* — Marilyn G Macasiano
(74) *Attorney, Agent, or Firm* — Klarquist Sparkman, LLP (57) ABSTRACT

Systems and methods are described for analyzing one or more online shopping missions to determine an estimated stage of a user within the mission and to adjust content for display to the user based on the estimated stage of the user within the mission. The estimated stage of the user within the mission may be determined using a model, such as a machine learning model, that accepts as input signals corresponding to the online shopping mission. The signals may represent user interface interactions and/or other data relating to the user and the mission.

20 Claims, 6 Drawing Sheets

MODIFICATION OF PRESENTED CONTENT BASED ON HISTORICAL DATA IN A SHOPPING MISSION

CROSS-REFERENCE TO RELATED APPLICATION

This application claims the benefit of U.S. Provisional Patent Application No. 63/066,741, entitled "INTENT-BASED SHOPPING FUNNEL IDENTIFICATION MODEL," filed Aug. 17, 2020, which is incorporated by reference herein in its entirety.

BACKGROUND

In online shopping, users of an online shopping merchant's storefront have different intents, based on how far along in a shopping mission the users are located. Some online shopping merchants' storefronts offer a search or browse tool to allow a user to specify product search parameters. However, this approach places a burden on the user to supply all parameters for the search, and often provide results that are too narrow, too broad, and/or otherwise undesirable for the user.

DETAILED DESCRIPTION

Today, personalized recommendations used by online merchants are primarily surfaced using customer actions like product views or purchases. However, the shopping experience remains largely unaware of higher-level intents associated with these events. For example, if a customer searches for women's running shoes and views a product from a selected brand, that may mean the customer has a preference for like-branded products, or the customer may be exploring the product space and like the look of that item. If the customer searches for women's running shoes and views ten products of the same brand, there is a higher confidence the customer has a strong preference or requirement for items made by that brand.

Understanding customers, products, and the shopping process is a complex problem. To do so successfully requires a framework for shopping that adds structure to an otherwise ambiguous task (Shopping Modes). Two key entities within this framework are the Shopping Mission and the Shopping Funnel. A Shopping Mission is defined as an objective the customer is trying to achieve on an online shopping merchant's platform (e.g., AMAZON). Past research has led to the development of a mission identification system (Customer Understanding Engine), which is described at least in part in U.S. patent U.S. Ser. No. 10/311,499, entitled "Clustering Interactions for User Missions," and U.S. patent application Ser. No. 16/694,697, entitled "Clustered User Browsing Mission for Products with User-Selectable Options Associated with the Products." The full disclosures of the above-referenced patent and the above-reference patent application are incorporated herein by reference for all purposes.

Figure 1:
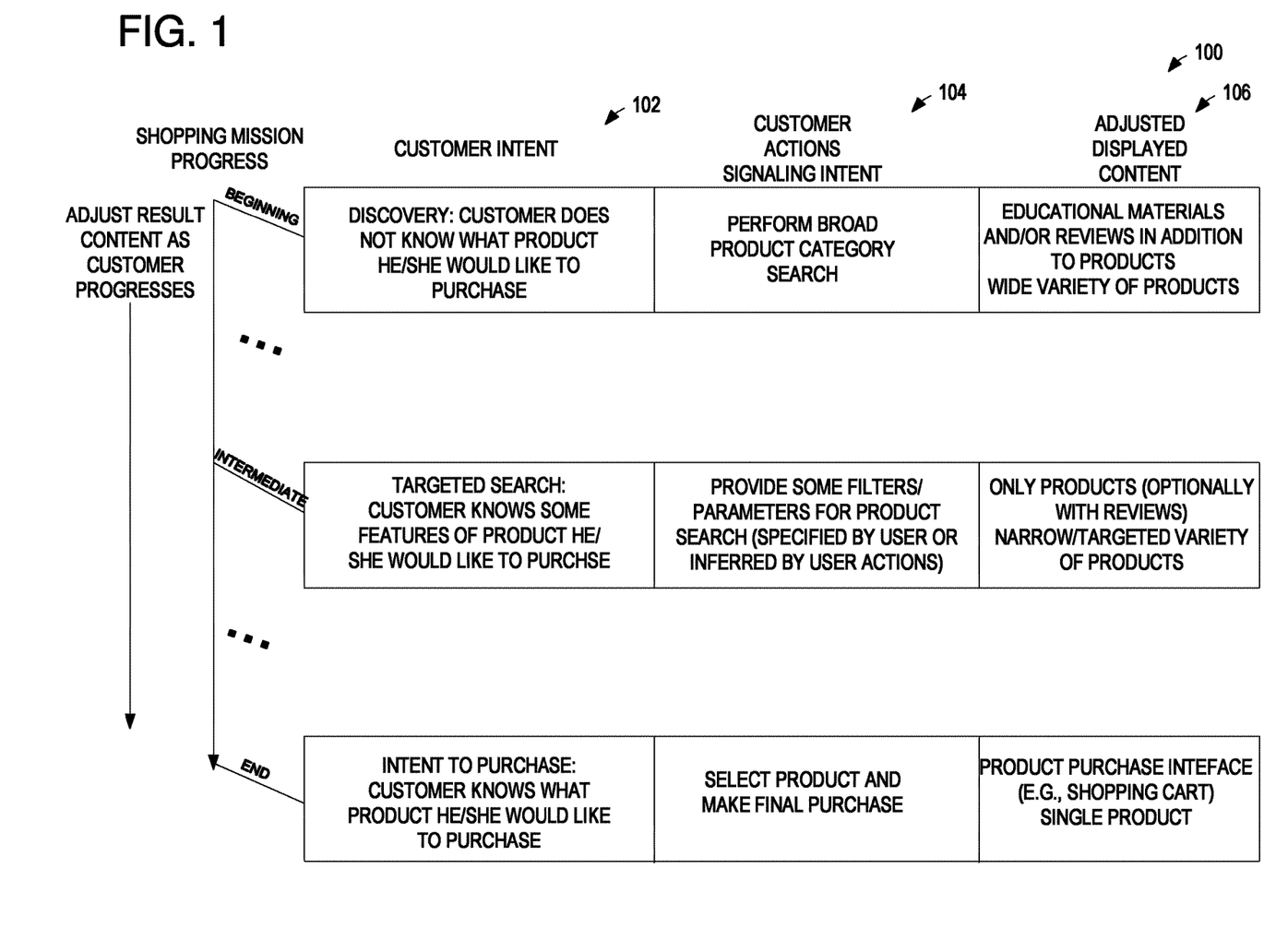
FIG. 1 schematically shows an example of an adjustment of displayed content as a customer progresses though a shopping mission.

The Shopping Funnel describes where the customer is (e.g., a position or stage of the customer) on a Shopping Mission. While past techniques in estimating the shopping model progress of users were useful in presenting relevant content, improvements can be made. Working backwards from the problems customers face over the course of their missions, a new approach to understanding a customer's intent in a shopping mission and adjusting content displayed to the customer during the shopping mission is schematically depicted in FIG. 1. For example, FIG. 1 shows a diagram 100 of examples of customer intent 102, customer actions 104, and resulting adjusted displayed content 106 at different stages as a user progresses through a shopping mission.

At a beginning stage, an example customer intent is that of discovery—in which the customer does not know what product he/she would like to purchase. Example customer actions that signal such intent include performing a broad product category search (e.g., searching generally for "televisions"). In order to target the results of a search query to the customer's intent (e.g., the customer's stage in the shopping mission), the content is adjusted to display, in the illustrated example, educational materials and/or reviews in addition to products, since the customer may desire to learn more about the product prior to making a selection. The products that are shown at the beginning stage are also more diverse than later stages, such that a wide variety of products (e.g., products having different brands, features, etc.) are provided to the customer. Customer preferences are then able to be inferred (e.g., progressing the customer to a later stage of the shopping mission) if patterns in customer selections of the products are detected. For example, if the customer views multiple products having the same feature/brand/etc., the customer is determined to have progressed to a later stage of the shopping mission and the observed patterns are used to adjust the displayed content as described in more detail below.

At an example intermediate stage, further along in the shopping mission, an example customer intent is a targeted search—in which the customer knows some features of a product that he/she would like to purchase. Example customer actions that signal such intent include providing some filters and/or parameters for a search query (e.g., specifying a television size, brand, refresh rate, resolution, and/or other parameters). These filters and/or parameters are provided directly by the customer (e.g., via input in a search query, adjustment of filters on results of a general search query, etc.) in some examples. In additional or alternative examples, one or more of these filters and/or parameters are inferred at least in part based on other user interactions/behaviors (e.g., past purchases, the customer viewing multiple products having overlapping parameters as described above, etc.). In some examples, the intermediate stage utilizes more historical data (e.g., as there exists more historical data for use) to adjust the displayed content relative to the beginning stage.

In order to target the results of the search query to the customer's intent (e.g., the customer's stage in the shopping mission), the content is adjusted to display, in the illustrated example, only products (optionally with reviews indicated for the displayed products to help the customer decide on a particular product). The displayed products are also less diverse than in earlier stages, having a narrow and/or targeted variety reflecting the specified/inferred parameters/filters. As will be described in the additional examples below, different stages of the shopping mission result in different amounts and/or types of information presented to the customer as results of a search query. In some examples, as the customer progresses through the shopping mission toward later stages, product listings are shown more prominently and/or having more unified/targeted parameters relative to the beginning stages of the shopping mission.

At an example end stage of the shopping mission, an example customer intent is an intent to purchase—in which the customer knows what product he/she would like to purchase. An example customer action signaling such intent includes selecting a product and making a final purchase. An example adjusted displayed content for this end stage includes a product purchase interface, such as an online shopping cart.

It is to be understood that although the shopping mission progress is illustrated in a progressive order (e.g., from beginning, intermediate, to end), the progress of an individual customer during an associated shopping mission is not limited to following a unidirectional path from beginning to end. In some examples, a customer, during the course of a shopping mission, moves between different stages of shopping mission progress in any direction(s). As one illustrative example, a customer enters a shopping mission at an intermediate stage and, after viewing results, reverts to a beginning stage (e.g., as evidenced by the customer broadening search parameters, performing less targeted interactions with products, etc.), then progresses back to an intermediate stage with differing parameters relative to those provided/inferred for the first intermediate stage.

To solve the above problem of estimating a customer's position in the shopping mission, a machine learning based approach was built to learn how different features of the customer's current mission predict shopping mission stage. In some implementations, simple heuristic functions such as length of time spent on the mission or number of events are inadequate to determine shopping mission stage, as customers will frequently move both down and up stages of the funnel during a mission. The location of the strategy (such as cart page vs detail page) also fails as a proxy for shopping mission stage in some implementations, as customers use the site in different ways like viewing the cart to see how close they are to getting free shipping.

To surpass these two hurdles, additional dimensions are extracted from customer activity on a mission to better understand the behavior of the customer. These dimensions vary between search queries and product views, but can include information such as brand and/or color intent, the time elapsed between the last two events, and/or the relative specificity of the query. For example, a brand intent is shown in some scenarios through a query such as "[BRAND 1] shoes" (where "BRAND 1" is a particular brand of interest), or by clicking on two shoes of the same brand (e.g., "BRAND 1") in succession.

To solve the shopping mission stage identification problem, a machine learning based approach was built to learn how the above-described dimensions predict shopping mission stage. The trained model is then used in online recommender systems to provide user interfaces and recommendations that are targeted to the customer's current position in the mission.

Figure 2:
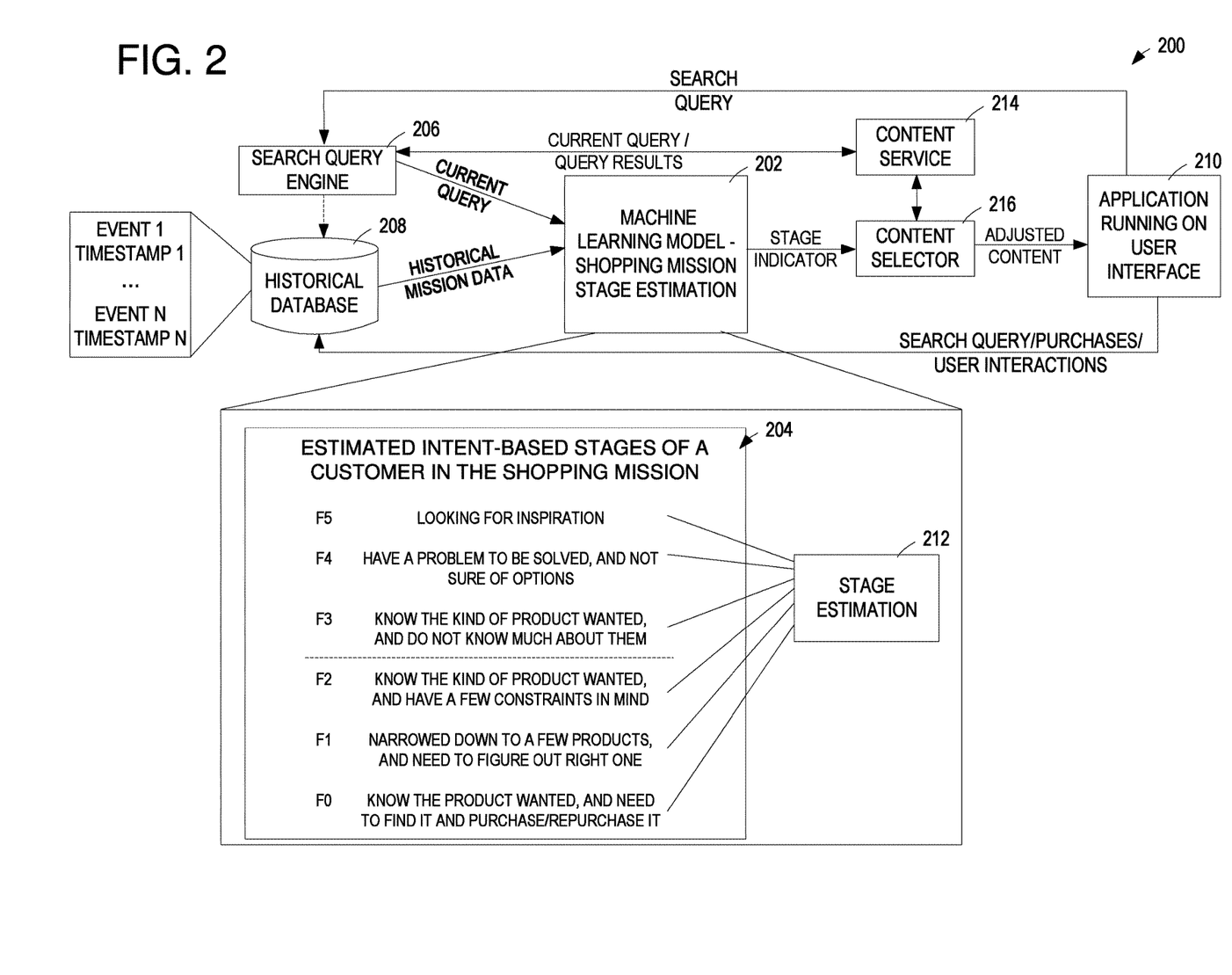
FIG. 2 shows a block diagram of an example system for estimating a stage of a customer within a shopping mission and adjusting content that is presented to the customer based on the estimated stage.

An example system 200 including a machine learning model 202 for identifying a shopping mission stage and adjusting result content correspondingly is shown in FIG. 2. Example modeled estimations of intent-based stages of a customer in the shopping mission are shown at 204, including six stages ordered by breadth of intent and ranging from F5—e.g., "I'm looking for inspiration," to F0—e.g., "I know the product I want and I just need to find it." The stages shown at 204 are also referred to herein as a shopping funnel model.

To move from theoretical framework to practical application, the shopping funnel model is built to automatically identify the funnel stage of a shopping mission. For the initial implementation the output is simplified to two stages: Lower (F0-F2) and Upper (F3-F5). The funnel stage classification can then be used to dynamically tailor the shopping experience in real-time, empowering customers to take the next best step towards completion of their mission. In other examples, the output of the model is expanded from the above-described binary example to a multi-option example, in which the model is configured to output an estimated position in the funnel as one of the six stages shown in FIG. 2.

The model 202 accepts as inputs a current query from a search query engine 206 and/or historical mission data from a historical database 208. The search query engine 206 accepts search queries from a user via an application running on a user interface 210 and processes the search queries to generate data (e.g., a current query) useable by the machine learning model 202 to identify a stage of a shopping mission (e.g., from the stages shown at 204) in which the user is positioned within the shopping mission.

The model 202 also accepts as inputs, in some examples, historical mission data from the historical database 208. The historical mission data may include a listing of timestamped events, as described in more detail below, indicating interactions of the user with the user interface and/or other events relevant to the shopping mission, which include search queries, past purchases, and other user interactions (e.g., user selections/views of products and other information, etc.) provided via the user interface 210 as shown in FIG. 2. Optionally, the historical database also receives, in some examples, results and/or other search query data from the search query engine 206. The model includes a stage estimation module 212, which uses the input signals from the historical database 208 similarly to the signals from the search query engine 206 to determine the stage of the customer in the shopping mission (e.g., from the stages shown at 204) and output a corresponding stage indicator. As described in more detail below, the stage indicator is used to adjust the content for display to the user in response to the search query based on the determined stage.

As described above, the model 202 is, in some examples, a machine learning model. There is no ground-truth dataset for funnel stage, so training datasets are generated using manually labelled data augmented with data from auto-labeling and active learning approaches. In some examples, a first step in the process includes processing the data in an offline data pipeline. Customer mission data is collected as timeline of events, bad or anomalous data is cleaned out (e.g., deleted or otherwise not included for analysis), and the dimensions from the sequence of events are extracted. The extracted dimensions are then used to compute various feature scores, e.g., a brand feature might get a score of 1 if every event in the mission belongs to the same brand and 0 if every event has an independent brand. Other features could include the acceleration between the time elapsed for the most recent events in the mission, the number of searches in the mission, and/or the average distance in vector space between embeddings for all the products in the mission.

In some examples, the model is then trained using all the mission feature scores. Determining funnel stage of shopping missions is a non-trivial task as there may not be any ground truth data. Manually labeling, auto-labeling, and/or active learning approaches are used to acquire a large training dataset. In one non-limiting example, a manually labelled funnel stage is used for an initial set of missions, and then this data is augmented by using statistically similar missions to the labelled set to create a large and diverse set of ground truth data. Training datasets are also generated through auto-labeling by using the probability of completing a mission as a proxy for funnel stage labels. Auto-labelled data is sampled from time series. The training data acquired from different approaches is combined to train and evaluate the model. The loss function is defined by considering the different accuracies of training data acquired from different channels and more highly weighting more reliable data sources. The training data is then fed into supervised machine learning systems to create a model that predicts funnel state based on the extracted features. Training data is resampled in an offline build to update the model daily to ensure that the model reflects current customer shopping patterns. In developing the described model, model selection is conducted over various models and the ensemble classifier with the best performance among all those considered is selected.

The selected model is then loaded in the online system. In the online system, features (e.g., all of the features) relating to the current customer's mission are then extracted and computed, and fed into the selected model to predict the mission's shopping stage. Features include any example of signals relating to the user and the shopping mission, which, in some examples, include interactions of the user with a user interface associated with the online merchant (e.g., text input, selections of products/links, searches, purchases, gaze/viewing data relating to information displayed on the user interface, etc.). In some examples, the features include the type of interaction and other parameters of the interaction, such as a time parameter (e.g., time between selections, acceleration between interaction events, etc.). In some examples, the model accepts as inputs a list of missions for a user, where each mission includes a list of events (e.g., features) relating to the respective mission. For each event, a timestamp indicating a time parameter of that event (e.g., relative to a real time and/or relative to a starting event corresponding to the mission) and an indication of the event (e.g., a target of the interaction, a type of interaction, etc.) is included as data for that event. Accordingly, the model is fed the above-described event data in order to estimate a position of the customer in a respective shopping mission.

Since the mission stage classification is ideally performed in real time with very low latency (e.g., under 40 ms), shared and not-frequently changing features, such as query specification, are, in some examples, pre-computed and cached offline, and served using a read-only database online to reduce the online computational requirements and latency. The cached features are refreshed using daily offline builds to regenerate the cache and model regularly (e.g., daily) and ensure they are up to date. Frequently changed features are computed online, such as the timestamp of the last viewed ASIN in a mission or other time-based features. Recommender systems are then called with mission and funnel stage information included in the call, allowing the recommender systems to supply recommendations that are more relevant and timely to the customers current wants and needs.

An example of the recommender systems is represented by the content service 214 and the content selector 216. The content service 214 is configured to gather content relating to a shopping mission, such that a subset of the content is selected by the content selector 216 based on a current estimated stage of the shopping mission for display via the user interface 210. For example, in addition to providing current query data to the machine learning model 202, the search query engine 206 also generates data indicating results of the search query (e.g., information relating to the search query, which include products matching parameters of the search query). The results data and/or the current query information are provided to the content service 214 and used by the content service to gather related content. For example, if the search query relates to televisions, the content service is configured to gather educational material relating to televisions in addition to product listings for televisions (which, in some examples, are selected based on the search query results), reviews for televisions, and/or other content relating to televisions. This additional, educational information is provided to the content service 214 by the search query engine 206, a secondary database remote from the content service/search query engine, and/or from within the content service (e.g., the content service includes storage media, in some examples, that stores educational materials for broad categories of searches that are matched with incoming search queries). In some examples, the content retrieved by the content service is organized and/or tagged with information usable by the content selector 216 to determine whether that content is relevant for a given stage of the shopping mission.

The content selector is configured to select, among the content retrieved by the content service 214 for the current shopping mission, content including product results and generate display instructions for provision to the user interface 210 in order to adjust content displayed via the user interface 210. As will further be described in more detail below, in some examples, the adjusted content shown to the user responsive to the search query includes products with diverse features, as well as educational materials and/or other information aside from product listings when the machine learning model outputs a stage indicator indicating that the customer is in a relatively early stage of the shopping mission. In some examples, the adjusted content shown to the user responsive to the search query includes targeted product results (e.g., with less diverse features than the early stages) when the machine learning model outputs a stage indicator indicating that the customer is in a relatively late stage of the shopping mission.

Figure 3:
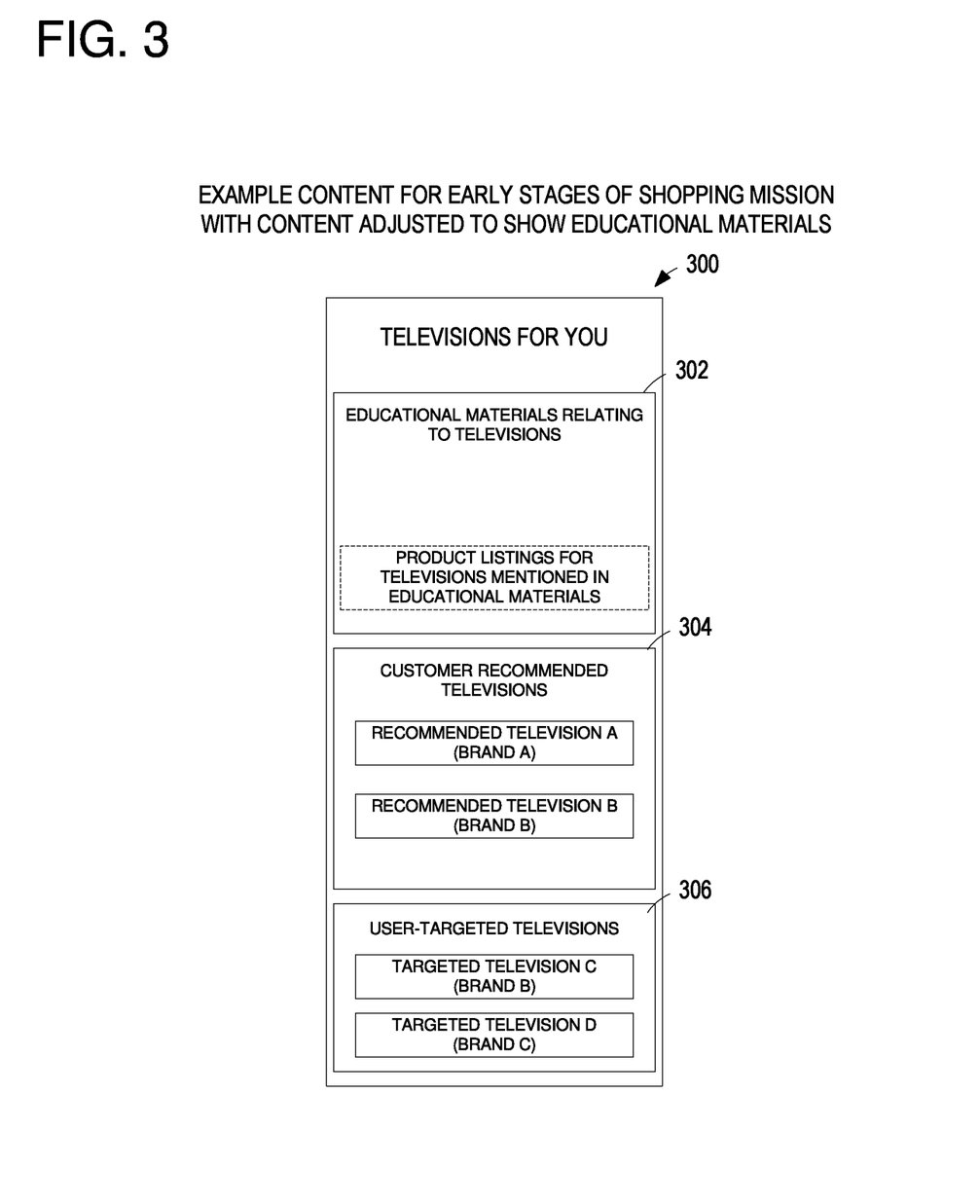
FIG. 3 shows example portions of a user interface including results displayed while a customer is in an upper (e.g., early) stage of a shopping mission.

One application of shopping stage is the mission hub page, which shows customers a wide variety of recommendations related to a single mission. The mission hub page is accessed via the application running on the user interface and, in some examples, displays the adjusted content output by the content selector. For example, the mission hub page uses the shopping funnel stage to determine which recommenders are actually displayed—if the mission is at an early stage, then a diverse set of recommendations included with testimonials will be displayed. An example of an output via a user interface of the online merchant when the estimated position of the customer in the mission is within the upper funnel (early stage) is shown in FIG. 3. A user interface 300 represents, in one example, a scrollable interface showing search query results for a customer identified to be in an early stage of the mission (e.g., shown responsive to the user inputting a search query to an associated online merchant). As shown, the results for a query that is made while a user is in an early stage of an online shopping mission (e.g., where there is little or no historical data for the user relating to the mission and/or where the user has not provided a targeted search query with a specificity that is above at least one threshold) include generalized information for products relating to the search query. For example, interface 300 includes a section 302 that shows educational materials relating to the search query (e.g., relating to products associated with the search query, in the illustrated example—televisions). Examples of educational materials include third party articles, consolidated reviews/recommendations, and/or other information from one or more local or remote sources that are useable to educate the user on products relating to the search query and/or associated information.

Interface 300 also includes a customer recommendation section 304 that highlights products relating to the search query, which are recommended by other users (e.g., products relating to the query that have a highest recommendation rating, number of recommendations above a threshold, and/or otherwise indicated to be recommended by other users). Interface 300 also includes suggested products 306 targeted to the user (e.g., based on additional information for the user, such as past purchase history and/or other user trends). Accordingly, the products presented to the users in the early stage are, in the illustrated example, organized and presented in identified groups (e.g., groups such as customer recommended, highly rated/well-priced, top picks for the user, other considerations by other users, related to past viewed items, etc.).

Figure 4:
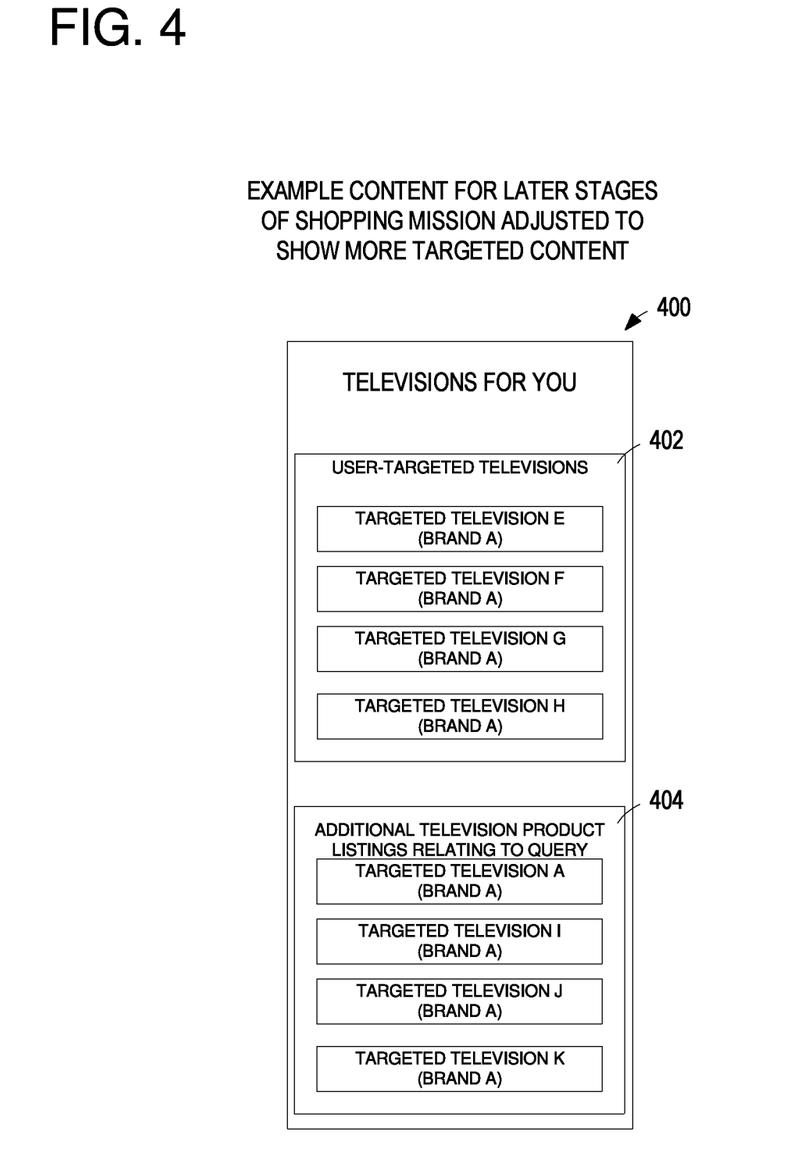
FIG. 4 shows example portions of a user interface including results displayed while a customer is in a lower (e.g., late) stage of a shopping mission.

If the mission is at a later stage then a narrower set of recommendations that are all closely related to the customers recent events will be displayed. An example of an output via a user interface of the online merchant when the estimated position of the customer in the mission is within the lower funnel (later stage) is shown in FIG. 4. For example, interface 400 is presented responsive to a search query for a product (e.g., a television in the illustrated example) in which historical data is available for the user indicating that the user is close to deciding on a television and/or the user is otherwise determined to be in a later stage of a shopping mission. The interface 400 is adjusted relative to interface 300 of FIG. 3 to show more targeted results and less additional, generalized information (e.g., the educational materials are removed). For example, interface 400 includes a listing of user-targeted televisions at 402 and additional television product listings at 404.

In some examples, when a user is determined to be in an early stage of a shopping mission, results of a query and/or products generally presented to a user relating to the shopping mission have a more diverse spread of features, brands, sizes, and/or other parameters than when a user is determined to be in a later stage of a shopping mission. Accordingly, the actual products identified for the user in the user interface are adjusted based on a stage in which the user is estimated to be positioned within the shopping mission. For example, as shown in FIG. 3, a wide array of brands of televisions are shown to the user. As the user progresses in the shopping mission, the content is adjusted as shown in interface 400 to target a particular brand in which the user has shown interest (e.g., by viewing products for that brand, providing an additional query targeting that brand, etc.). In additional or alternative examples, content, such as information about the products identified for the user and/or information relating to the shopping mission, is adjusted based on a stage in which the user is estimated to be positioned within the shopping mission. In some examples, more details of reviews, recommendations, and/or other information are presented for users that are estimated to be in an earlier stage of the mission relative to users that are estimated to be in a later stage. Further, as shown in FIGS. 3 and 4, different categories of results are shown for the different stages. For example, in the illustrated embodiments, while in an earlier stage, categories such as top picks from a review site and/or from the online merchant, customer recommended products, and customer considerations are presented. Conversely, while in a later stage, categories such as "Customers ultimately bought," "Related to items you've viewed," and "Frequently bought together" are presented. In some examples, positioning of different categories of results is adjusted based on an estimated position of the user in the mission. In one embodiment, a "Top picks for you" category of results is presented for users in both earlier and later stages of the mission, however, the "Top picks for you" is shown at a more prominent and/or higher position in the user interface for a user in a later stage of the mission relative to a user in the earlier stage of the mission. It is to be understood that the above examples of adjustments to information that is presented and/or configured for presentation to the user based on the user's estimated position in a mission is exemplary, and any suitable adjustment may be performed without departing from the scope of this disclosure.

Example Method

Figure 5:
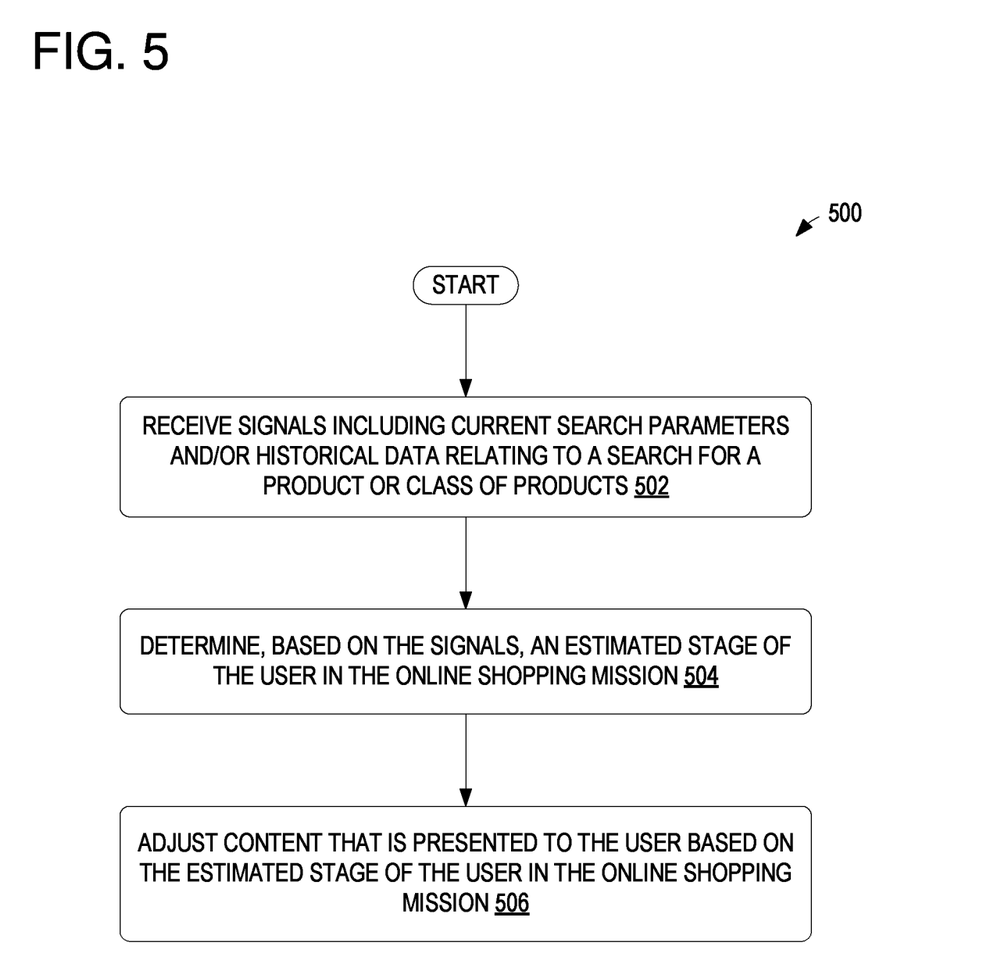
FIG. 5 is a flow chart of an example method for adjusting content that is presented to a user during a shopping mission based on an estimated stage of the user in the shopping mission.

FIG. 5 is a flow chart of an example method 500 for adjusting content that is presented to a user during a shopping mission based on an estimated stage of the user in the shopping mission. For example, FIG. 5 may be performed by the machine learning model 202 of FIG. 2 in coordination with the other depicted elements of FIG. 2 in order to customize a shopping experience for a user based on an estimated progress of the user in a shopping mission (e.g., as shown in FIG. 1).

At 502, the method includes receiving signals including current search parameters and/or historical data relating to a search for a product or class of products. For example, as shown in FIG. 2, current search parameters are received from a search query engine and/or other source indicating a current search query of a user. As further shown in FIG. 2, historical data is received from a historical database and/or other source. As described above with respect to FIGS. 1 and 2, the current search parameters are received and/or inferred based on information from one or more sources, including direct search queries (e.g., searches for a particular product or class of products), historical user interaction data (e.g., user selections of products relating to the shopping mission and/or past shopping missions, user view data, etc.), and/or historical product purchases.

At 504, the method includes determining, based on the signals, an estimated stage of a user in the online shopping mission. As described above, the current search query includes information usable to derive results of the search query (e.g., terms that are associated with selected products and/or classes of products). The current search query is also usable to estimate a stage of a user in a shopping mission. For example, as described above with respect to FIG. 1, a search query that includes few or no parameters (e.g., fewer parameters than a threshold) is indicative of a user being in an early stage of a shopping mission (e.g., closer to a beginning than an end of the shopping mission). Alternatively, a search query that includes more targeted parameters (e.g., more parameters than a threshold or otherwise a query having more specificity than a threshold) is indicative of a user being in a later stage of a shopping mission (e.g., closer to an end than a beginning of the shopping mission).

Similarly, the historical data (alone or in coordination with search query data) is usable to estimate a stage of the user in the shopping mission by determining prior interactions of the user indicating familiarity or preferences associated with a subject of the current search query. For example, if a user has, at a previous point in the shopping mission, selected multiple products of a same brand, the historical data is indicative, in some examples, of a preference for the brand, and indicates that the user is in a later stage of a shopping mission in which the parameters of the search query are able to be targeted to the preferred brand. Alternatively, a lack of historical data (or a minimal amount of historical data) is indicative of a user in an earlier stage of a shopping mission. It is to be understood that the historical data and current search query data are used in coordination to estimate the stage of the user in the shopping mission. For example, if no historical data is available, suggesting that the user is in an early stage of the shopping mission, yet the user inputs a targeted search query with multiple specific parameters, the user is, in some examples, estimated to be in a late stage of the shopping mission due to the parameters of the search query.

In addition to the actual events associated with the historical data, time parameters associated with the events (e.g., as correlated with other events for the shopping mission) are useable to estimate the stage of the user in the shopping mission. For example, parameters such as time between events, acceleration of time between events, ratio of types of events (e.g., searches versus product/page views/selections), etc. are used in some examples to estimate the stage in the shopping mission. Additional examples of time-related parameters and other event parameters (e.g., query length, etc.) are described below. As one non-limiting detailed example, a ratio of search events to selections or views of products during the online shopping mission may be used to estimate a stage of a shipping mission, where the estimated stage of the user in the online shopping mission is determined to be in a first, early stage when the ratio of search events to selections or views of products during the online shopping mission is above a threshold and wherein the signals indicate that the estimated stage of the user in the online shopping mission is determined to be in a second, late stage when the ratio of search events to selections or views of products during the online shopping mission is below the threshold.

At 506, the method includes adjusting content that is presented to the user based on the estimated stage of the user in the online shopping mission. Adjusting the content may include changing an amount, order, or type (e.g., spread of parameters) of search results presented to a user interface, examples of which are shown in FIGS. 3 and 4 and discussed above with respect to FIGS. 1 and 2. An adjustment of content responsive to the user being in an early stage of the shopping mission includes showing educational materials (as shown at 302 in FIG. 3) in some examples. An adjustment of content responsive to the user being in a late stage of the shopping mission includes showing primarily or only products having targeted parameters (as shown at 402 in FIG. 4) in some examples.

Example Detailed Approach

One way to determine whether customers are in the upper or lower funnel (e.g., earlier versus later stages) involves looking at simple heuristics for the mission and building up a rule based system. This is limited in accuracy in the same way that all rule based systems are, but has the advantage of being very easy to implement and very efficient in terms of computation. To use heuristics, it is first determined which measures are indicative of upper vs lower funnel behavior. This is done by splitting up a sample dataset into two segments, one for upper funnel and one for lower funnel.

In an ideal world this split would be done using a manually labeled training set. But as such a dataset does not exist, instead, upper funnel missions are approximated by those missions without a purchase whose length is less than 10. Lower funnel missions are identified as missions with a purchase with a length greater than 2. Data cleaning is also performed on both segments, to remove missions with less than 1 or more than 28 total events, which are typically noisy, and to remove any missions without a customer id, as such missions cannot be completed and would skew the data.

Once these datasets are segmented, a 2-sample t-test is conducted for independence on the segments. A null hypothesis is that the two segments have the same means (essentially that they exhibit the same behavior along whatever metric the heuristic is measuring).

Table 1 shows example heuristics that may be considered as metrics for determining a customer's position in the funnel. In the below table, (L) indicates lower funnel behavior, and (U) indicates upper funnel behavior.

TABLE 1

Example heuristics

| Heuristic | Heuristic Description | T-Test Result (Observed Diff in Means) | Explanation |
| --- | --- | --- | --- |
| len | Total number of events in the mission | −108 (L) | Expected since we define upper and lower funnel in terms of # of events such that lower funnel will average more events |
| time_gap | Time since the last event in the mission, capped to 5 minutes | −151 (L) | Shows that customers typically spend more time considering in the lower funnel |
| total_time | Time since the start of the mission | −123 (L) | Expected since missions with more events will tend to take longer time as well |
| searches | # of Searches in Mission | 72 (U) | Very unexpected, since lower funnel missions are typically longer so have more chances to search. |
| since_search | # of Events Since Last Search in Mission | −178 (L) | Shows that customers that do make a purchase typically do so well after searching |

TABLE 1-continued

Example heuristics

| Heuristic | Heuristic Description | T-Test Result (Observed Diff in Means) | Explanation |
|---|---|---|---|
| search_ratio | Ratio of Search Events to Clicks in Mission | 249 (U) | Same as above, means lower funnel customers typically click more than search |
| accel | Time Gap Acceleration (change in velocity for time between events over last 3 events, where velocity between events is 1/(time_gap)) | −11 (L) | Shows that customers tend to slow down more in the lower funnel |
| max_accel | Maximum Time Gap Acceleration in Mission | −100 (L) | Expected since missions with more events will tend to have a larger maximum acceleration |
| pct_accel | Ratio Current/Maximum Time Gap Acceleration | −5 (L) | Same as time gap acceleration |
| mr_query_len | Most Recent Query Length in Characters | 139 (U) | Customers in the upper funnel tend to input longer searches |
| pct_query_len | Ratio of Most Recent/Maximum Query Length | 166 (U) | Expected since upper funnel searches tend to be longer, so will be a greater percentage of the maximum |

Given the above associations in Table 1, the ratio of search events to clicks in the mission, time gap, and most recent query length are the three strongest associations (or three least likely to occur association) that were not expected. Thus, these are likely to be used to determine upper vs lower funnel behavior using a heuristic based approach. Implementation of all these would involve computing average stats for these heuristics for an hour's worth of logs offline, and then loading these averages into the online service. The upper funnel or lower funnel would then be predicted based on whether the majority of the statistics for the current mission are above or below the observed average.

In some implementations, the following heuristics are also investigated to see if they are indeed predictive: 1) Price Acceleration—Exploit previous analysis and compute % change of price differences to determine where customer is on funnel. 2) Distance in similarities graph between each step, where smaller steps likely means the customer is in the lower funnel since they are considering more closely related products. However, it is computationally expensive to load similarities graph and compute distance for each mission. 3) Query/ASIN conversion rate—some ASINs and searches have higher purchase/view ratio than others, which could be predictive of lower funnel behavior.

With these three initial heuristics determined, their respective effectiveness is evaluated by comparing against another methodology that uses stochastic gradient descent to learn a regression across various components of the mission (referred to as SGD in the screenshots referenced below). The SGD model is trained using automatically labeled backlog data where if a mission is completed in the next 90 minutes then it is identified as upper funnel.

Comparator tests are run to judge how frequently the two models differ. To do so, 1 MM missions of recent CUE data with unique customer IDs are extracted, and these missions are input into both classification models. It was found that the two approaches agreed on 59% of all missions; breaking down further, the approaches agreed on 64% of all missions with a purchase, and 56% of all missions that did not contain a purchase.

The comparison is somewhat complicated by the fact that the stochastic gradient descent model outputs an unknown classification when there are either no clicks in the mission, or the majority of the clicks are on the digital products. These cases made up 8.5% of the 1 MM missions. If they are ignored, then the approaches agree 65% of the time overall, and on 66% and 65% of missions with a purchase and no purchase respectively.

With these numbers it is concluded that there is a substantive difference between the two models, but it is not clearly concluded which model performs better. To evaluate this, a dataset previewer was set up to display random missions along with what both models would classify the mission as, so that it was visible which model agreed with our manual classification of the mission.

After manually labelling >200 total missions, the two approaches were compared. It was found that the heuristic approach outlines above agreed with the manual classification 75% of the time, compared to ~50% of the time for the stochastic gradient descent model, showing the effectiveness of the basic rules.

This set of manually labeled missions are used in some examples to cross validate the associations that were found in the first step, since these were found off of a very naive split of the data into upper and lower funnel. However, the golden truth dataset is very small and lacks significant variation. Additional data is generated by performing bootstrap sampling on the dataset to make it much larger, and then blending it with a random sample of the original naive split. This blended dataset is then used to validate new heuristic functions, as shown in Table 2. In Table 2, (L) indicates lower funnel behavior and (U) indicates upper funnel behavior.

TABLE 2

Example heuristics with Golden dataset T-Test results.

| Heuristic | Heuristic Description | T-Test Result (Observed Diff in Means) | Golden Dataset T-Test Result | Explanation |
|---|---|---|---|---|
| len | Total number of events in the mission | −108 (L) | 8.52 (U) | Expected since we define upper and lower funnel in terms of # of events such that |

TABLE 2-continued

Example heuristics with Golden dataset T-Test results.

| Heuristic | Heuristic Description | T-Test Result (Observed Diff in Means) | Golden Dataset T-Test Result | Explanation |
|---|---|---|---|---|
| time_gap | Time since the last event in the mission, capped to 5 minutes | −151 (L) | −184.9 (L) | lower funnel will average more events Shows that customers typically spend more time considering in the lower funnel |
| total_time | Time since the start of the mission | −123 (L) | −21.9 (L) | Expected since missions with more events will tend to take longer time as well |
| searches | # of Searches in Mission | 72 (U) | 149.2 (U) | Very unexpected, since lower funnel missions are typically longer so have more chances to search. |
| since_search | # of Events Since Last Search in Mission | −178 (L) | −88.43 (L) | Shows that customers that do make a purchase typically do so well after searching |
| search_ratio | Ratio of Search Events to Clicks in Mission | 249 (U) | 180.46 (U) | Same as above, means lower funnel customers typically click more than search |
| accel | Time Gap Acceleration (change in velocity for time between events over last 3 events, where velocity between events is 1/(time_gap)) | −11 (L) | −29.1 (L) | Shows that customers tend to slow down more in the lower funnel |
| max_accel | Maximum Time Gap Acceleration in Mission | −100 (L) | −1.64 (L) | Expected since missions with more events will tend to have a larger maximum acceleration |
| pct_accel | Ratio Current/Maximum Time Gap Acceleration | −5 (L) | −10.54 (L) | Same as time gap acceleration |
| mr_query_len | Most Recent Query Length in Characters | 139 (U) | −72.7 (L) | Customers in the upper funnel tend to input longer searches |
| pct_query_len | Ratio of Most Recent/Maximum Query Length | 166 (U) | −16.8 (L) | Expected since upper funnel searches tend to be longer, so will be a greater percentage of the maximum |
| mr_query_w | Most Recent Query Length in Words | N/A | 90.06 (U) | Similar to most recent query length |
| mr_distance | Distance in Sims Network between last clicks (if item2 is a similarity of item1 or vice versa the distance is 0, otherwise it is 1) | N/A | 175.8 (U) | Looks to be a very strong association with upper funnel, which is expected given that customers are |

TABLE 2-continued

Example heuristics with Golden dataset T-Test results.

| Heuristic | Heuristic Description | T-Test Result (Observed Diff in Means) | Golden Dataset T-Test Result | Explanation |
|---|---|---|---|---|
| distance | Average distance in Sims Network in last 3 clicks | N/A | 30.1 (U) | exploring a wider range of products in the upper funnel. Same as above |
| since_gl | # of clicks since GL change | N/A | −159.5 (L) | Expected, shows that lower funnel missions typically have not changed gls in a while. |
| mr_qu_click | Most recent query click specificity | N/A | −53.9 (L) | Expected, shows that lower funnel missions typically have a more specific query and clicks resulting off of it. |

A limited form of validation is also performed on the golden truth dataset to check how representative it is, since it only contains 100 missions, by computing averages for these various factors across all missions in the initial dataset (~1 MM) and comparing them to the averages in the training dataset. This is shown in Table 3 below for a few selected functions.

TABLE 3

Example comparison of averages for various factors across missions.

| Function | Initial Dataset Average | Blended Dataset Average |
|---|---|---|
| Time Gap | 219.01 | 237.11 |
| Search Ratio | 0.18 | 0.25 |
| # of Events Since Last Search in Mission | 11.86 | 13.82 |
| Most Recent Query Length | 0.83 | 0.81 |
| Average distance in Sims Network in last 3 clicks | 1.93 | 2.18 |

There certainly is a difference in the last two datasets, but for these factors, the averages appear to be at least similar, so that the golden dataset is a somewhat reasonable representation of the overall.

Ruleset Selection

With these correlations between factors and funnel state in mind, the correlation between the various factors is examined. From a research perspective this allows for the identification of which signals are unique and which are tightly linked, and from a business perspective this ensures that a diverse set of rules that are all measuring different things are selected, rather than rules that all measure the same aspect of the mission. Thus, the diverse weak classifiers can all be merged together into a strong ensemble classifier as in boosting.

Ruleset Correlations

Some factors are very strongly correlated together that would be expected, such as most recent query length and the ratio of the most recent query length to the longest query. It is to be understood that these are absolute values of the correlations, as if two classifiers are strongly negatively correlated then they are still measuring a similar factor. In this example, a correlation chart is then used to select the heuristics that are most strongly correlated with upper or lower funnel behavior but most weakly correlated with other heuristics.

Ruleset Evaluations

The rule sets that are most predictive are determined by comparing how different rule sets would evaluate missions vs the golden dataset. There are two naive implementations that are initially considered to do so. First is a simple greedy algorithm to identify the functions most correlated with funnel state that are not associated with any of the other functions that have been previously selected. As an illustrative example one could set the max correlation between factors to be 0.3 and the minimum correlation between the factors and the funnel state to be 30, then the algorithm would use time_gap, mr_qu_click, distance, and search_ratio as the rules. However, this greedy approach yields suboptimal combinations of rules, since it optimizes towards the strongest individual classifiers, rather than the strongest set of classifiers.

An alternate method of doing so includes generating every possible combination of rules and evaluating on the whole dataset. However, there are considerations with this approach, as the golden datasets size is small, so it is difficult to make any firm conclusions. This method would also include training on the test data in this case, as there would be no independent sample to verify the most promising rule sets again. There would also be space and time complexity issues; the number of ruleset combinations is:

$$\binom{n}{x} \frac{n!}{x!(n!-x)!}$$

and since 16 different rules are evaluated and the right number of rules is unclear, there would be:

$$\sum_{x=1}^{16} \frac{16!}{x!(16!-x)!}$$

total combinations.

These problems are addressable with some slight optimizations. In some examples, k-fold validation is used on the dataset to split it into k different test/training data sets, and the average accuracy is computed on each of these k sets to determine the rulesets that are most accurate across different sets of training and test data. Different combinations of rulesets are generated by only generating rulesets of length >=3 and <=10 to ensure diversity while also not adding so many rules that we run into latency issues. An initial evaluation of these rulesets is performed on a small random subset of data (n=50) and then the top 1000 models is considered for the more expensive k-fold validation step. The 20 models with the highest average accuracy across the k-folds is manually considered, and a model with the high accuracy and low inter-correlations is selected.

TABLE 4

Example Ruleset Evaluations
Ruleset Evaluations Table

| Ruleset | Average % Accuracy | Median % Accuracy | Maximum Rule Inter-Correlation | Average Rule Inter-Correlation |
|---|---|---|---|---|
| since_search, search_ratio, accel, mr_query_len, distance | 0.78 | 0.8 | 0.67 | 0.18 |
| since_search, search_ratio, pct_accel, mr_query_len, distance | 0.78 | 0.8 | 0.67 | 0.17 |
| searches, since_search, accel, mr_query_len, distance | 0.775 | 0.75 | 0.5 | 0.15 |
| since_search, search_ratio, accel, pct_query_len, distance | 0.775 | 0.8 | 0.76 | 0.19 |
| since_search, search_ratio, accel, pct_accel, mr_query_len, distance, since_gl | 0.775 | 0.775 | 0.67 | 0.16 |
| searches, since_search, accel, distance, since_gl | 0.775 | 0.8 | 0.56 | 0.18 |
| time_gap, searches, since_search, accel, pct_query_len, distance, since_gl | 0.775 | 0.75 | 0.56 | 0.19 |
| searches, since_search, accel, pct_accel, distance, mr_distance, since_gl | 0.77 | 0.775 | 0.78 | 0.16 |
| since_search, accel, distance | 0.77 | 0.775 | 0.3 | 0.12 |
| len, since_search, search_ratio, pct_accel, mr_query_len, distance, since_gl | 0.77 | 0.8 | 0.67 | 0.23 |
| searches, since_search, pct_accel, mr_query_len, distance | 0.77 | 0.75 | 0.5 | 0.15 |
| since_search, search_ratio, accel, mr_query_w, distance | 0.77 | 0.8 | 0.67 | 0.18 |
| since_search, search_ratio, pct_accel, pct_query_len, distance | 0.77 | 0.775 | 0.76 | 0.19 |
| time_gap, searches, since_search, mr_query_len, distance | 0.77 | 0.775 | 0.5 | 0.24 |
| searches, since_search, accel, mr_query_w, distance | 0.77 | 0.75 | 0.51 | 0.15 |
| searches, since_search, accel, pct_query_len, distance | 0.77 | 0.75 | 0.46 | 0.15 |
| searches, since_search, pct_accel, mr_query_w, distance | 0.77 | 0.75 | 0.51 | 0.15 |
| searches, since_search, pct_accel, pct_query_len, distance | 0.77 | 0.75 | 0.46 | 0.14 |
| searches, since_search, pct_accel, distance, since_gl | 0.77 | 0.8 | 0.56 | 0.17 |
| since_search, search_ratio, accel, pct_accel, pct_query_len, distance, since_gl | 0.765 | 0.8 | 0.76 | 0.16 |

Using the information in Table 4, the rulesets of searches, since_search,accel,mr_query_len,distance and since_search, accel,distance are evaluated to be most promising in this example. The former is tied for the highest while also having the lowest average and max rule intercorrelation, while the later ruleset is only slightly less accurate but the most closely correlated to rules are only correlated 30%, and it relies on very few rules.

These rule sets are evaluated by generating a decision tree to classify missions. The top nodes in the decision are the most predictive of the final output state, and in one example, since_search is the single most important feature, which is present in all of the top 20 rule sets as well. Distance, max_accel, total_time, mr_query_len and search_ratio are also nodes near the top and are likewise frequently present in the 20 rule sets.

Example Final Selection

In one example, the rule set of since_search,accel,distance is implemented for an initial version. This ruleset has a median accuracy across different training samples of 77.5%, and an average accuracy of 77%. This is in contrast to a random weighted classifier that has an average accuracy of 57%, and a logistic regression model which had an accuracy of 50%. It is a set of diverse rules with low inter-correlation, and thus captures several different aspects of the customer mission to classify the state. Finally, it is a small rule set, so will have minimal performance impact and developer time requirements for this initial version.

Example Customer Understanding Engine (CUE) Integration

The disclosed technologies are, in some examples, implemented in CUE to be consumed by the mission hub. This allows for downstream services to consume the data. In some examples, an enum structure is created to store the predicted state information. While the full shopping diagram outlines 9 possible states (or F-scores), only two of these states are vended initially in some examples; that is, the other states will all be implemented, but never actually output as a prediction in such examples. In other examples, all or a subset of the 9 possible states are output. In some examples, an "unknown" value is also output, which will also be unused currently but will give flexibility for future implementations.

Figure 6:
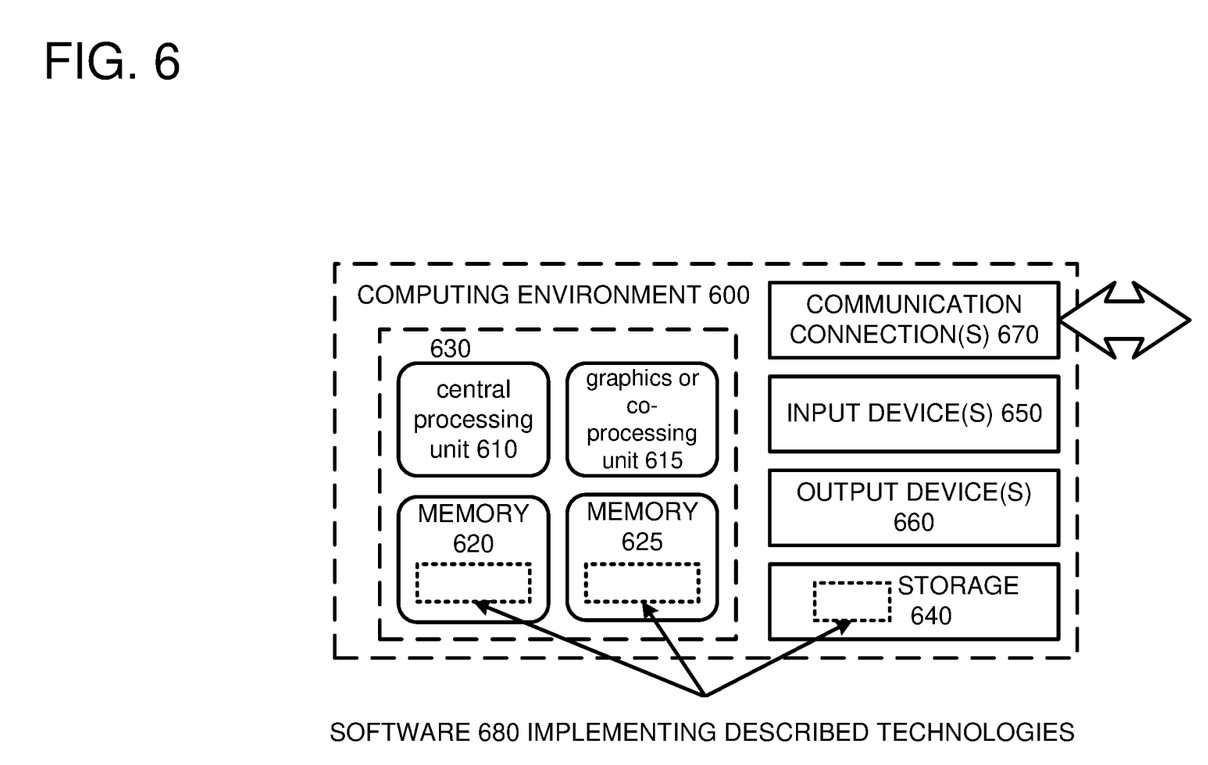
FIG. 6 depicts a generalized example of a suitable computing environment in which the described innovations may be implemented.

FIG. 6 depicts a generalized example of a suitable computing environment 600 in which the described innovations may be implemented. For example, the computing environment 600 includes and/or is included in the machine learning model 202 and/or the remaining components of system 200 of FIG. 2 and used to estimate a stage of a user in an online shopping mission and adjust content displayed as search results for the shopping mission based on the estimated stage. As another example, method 500 of FIG. 5 is performed using one or more components of computing environment 600. The computing environment 600 is not intended to suggest any limitation as to scope of use or functionality, as the innovations may be implemented in diverse general-purpose or special-purpose computing systems. For example, the computing environment 600 can be any of a variety of computing devices (e.g., desktop computer, laptop computer, server computer, tablet computer, etc.).

With reference to FIG. 6, the computing environment 600 includes one or more processing units 610, 615 and memory 620, 625. In FIG. 6, this basic configuration 630 is included within a dashed line. The processing units 610, 615 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 6 shows a central processing unit 610 as well as a graphics processing unit or co-processing unit 615. The tangible memory 620, 625 may be volatile memory (e.g., registers, cache, RAM), non-volatile memory (e.g., ROM, EEPROM, flash memory, etc.), or some combination of the two, accessible by the processing unit(s). The memory 620, 625 stores software 680 implementing one or more innovations described herein, in the form of computer-executable instructions suitable for execution by the processing unit(s). The software 680, in some examples, is executed to perform method 500 of FIG. 5 and/or to implement the model 202 of FIG. 2.

A computing system may have additional features. For example, the computing environment 600 includes storage 640, one or more input devices 650, one or more output devices 660, and one or more communication connections 670. An interconnection mechanism (not shown) such as a bus, controller, or network interconnects the components of the computing environment 600. Typically, operating system software (not shown) provides an operating environment for other software executing in the computing environment 600, and coordinates activities of the components of the computing environment 600.

The tangible storage 640 may be removable or non-removable, and includes magnetic disks, magnetic tapes or cassettes, CD-ROMs, DVDs, or any other medium which can be used to store information in a non-transitory way and which can be accessed within the computing environment 600. The storage 640 stores instructions for the software 680 implementing one or more innovations described herein.

The input device(s) 650 may be a touch input device such as a keyboard, mouse, pen, or trackball, a voice input device, a scanning device, or another device that provides input to the computing environment 600. The output device(s) 660 may be a display, printer, speaker, CD-writer, or another device that provides output from the computing environment 600.

The communication connection(s) 670 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., one or more optical media discs, volatile memory components (such as DRAM or SRAM), or non-volatile memory components (such as flash memory or hard drives)) and executed on a computer (e.g., any commercially available computer, including smart phones or other mobile devices that include computing hardware). The term computer-readable storage media does not include communication connections, such as signals and carrier waves. Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, aspects of the disclosed technology can be implemented by software written in C++, Java, Perl, any other suitable programming language. Likewise, the disclosed technology is not limited to any particular computer or type of hardware. Certain details of suitable computers and hardware are well known and need not be set forth in detail in this disclosure.

It should also be well understood that any functionality described herein can be performed, at least in part, by one or more hardware logic components, instead of software. For example, and without limitation, illustrative types of hardware logic components that can be used include Field-programmable Gate Arrays (FPGAs), Program-specific Integrated Circuits (ASIC s), Program-specific Standard Products (AS SPs), System-on-a-chip systems (SOCs), Complex Programmable Logic Devices (CPLDs), etc.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved.

In view of the many possible embodiments to which the principles of the disclosed invention may be applied, it should be recognized that the illustrated embodiments are only examples of the invention and should not be taken as limiting the scope of the invention. We therefore claim as our invention all that comes within the scope of these claims.

What is claimed is:

1. A system for analyzing one or more online shopping missions, the system comprising:
    a memory configured to store computer-executable instructions; and
    a processor in communication with the memory configured to execute the computer-executable instructions to at least:
        analyze signals corresponding to an online shopping mission of a user of an online merchant, the signals including current search parameters and historical data relating to a search for a product or class of products;
        determine from the signals, using a machine learning model executed by the processor, an estimated stage of the user in the online shopping mission, wherein the stages of the online shopping mission progresses include a beginning stage, in which minimal historical data is available, one or more intermediate stages, in which additional historical data and search parameters are available, and an end stage, in which a selected product relating to the search is purchased; and
        automatically adjust content configured for display via a user interface associated with the online merchant based on the estimated stage of the user in the online shopping mission, wherein the content is adjusted to include educational materials relating to the product or class of products when the estimated stage of the user in the online shopping mission is a first, early stage and wherein the content is adjusted to include targeted products when the estimated stage of the user in the online shopping mission is a second, late stage in the online shopping mission.

2. The system of claim 1, wherein adjusting the content further comprises adjusting a selection of products that are configured for presentation to the user based on the estimated stage of the user in the online shopping mission.

3. The system of claim 1, wherein adjusting the content further comprises adjusting an amount of information for each product that is configured for presentation for the user based on the estimated stage of the user in the online shopping mission, and wherein the amount of information for each product that is configured for presentation is higher for the first stage than the second stage.

4. The system of claim 1, wherein the signals include data corresponding to interactions between the user and a user interface associated with the online merchant during the online shopping mission, wherein the data corresponding to interactions between the user and the user interface includes a time elapsed between two user interface interaction events or a specificity of parameters of a search query.

5. The system of claim 4, wherein the data corresponding to interactions between the user and the user interface further includes a selection of products displayed during the online shopping mission.

6. A method comprising:
    receiving signals corresponding to an online shopping mission of a user, the signals including current search parameters or historical data relating to a search for a product or class of products;
    determining, by a processor, based on the signals corresponding to the online shopping mission of the user, an estimated stage of the user in the online shopping mission; and
    automatically adjusting content that is displayed to the user in a user interface in correspondence to results of the search based on the estimated stage of a user in an online shopping mission.

7. The method of claim 6, wherein the estimated stage of the user in the online shopping mission is determined based on a machine learning model that accepts as inputs the signals corresponding to the mission, and wherein the signals include a search query made by the user during the shopping mission.

8. The method of claim 7, wherein the signals include a specificity of parameters of the search query, and wherein the signals indicate that the estimated stage of the user in the online shopping mission is in a first, early stage when the specificity of parameters is below a threshold and wherein the signals indicate that the estimated stage of the user in the online shopping mission is determined to be in a second, late stage when the specificity of parameters is above a threshold, the first stage being earlier in the shopping mission than the second stage, and a latest stage of the shopping mission corresponding to a selection of a targeted product for purchase by the user.

9. The method of claim 7, wherein the signals include a ratio of search events to selections or views of products during the online shopping mission, and wherein the signals indicate that the estimated stage of the user in the online shopping mission is determined to be in a first, early stage when the ratio of search events to selections or views of products during the online shopping mission is above a threshold and wherein the signals indicate that the estimated stage of the user in the online shopping mission is determined to be in a second, late stage when the ratio of search events to selections or views of products during the online shopping mission is below the threshold, the first stage being earlier in the shopping mission than the second stage, and a latest stage of the shopping mission corresponding to a selection of a targeted product for purchase by the user.

10. The method of claim 7, wherein the signals further include an interaction of the user with content that is displayed during the online shopping mission.

11. The method of claim 6, wherein adjusting the content includes displaying, via the user interface, generalized content for a class of products relating to the online shopping mission while the estimated stage of the user in the online shopping mission is determined to be a first, early stage and displaying, via the user interface, targeted products relating to the online shopping mission while the estimated stage of the user in the online shopping mission is determined to be a second, late stage, the first stage being earlier in the online shopping mission than the second stage, and a latest stage of the shopping mission corresponding to a selection of one of the targeted products for purchase by the user.

12. The method of claim 6, wherein the content includes generalized educational materials relating to a class of products corresponding to the online shopping mission when the estimated stage of the user in the online shopping mission is determined to be a first, early stage.

13. The method of claim 12, wherein adjusting the content includes removing the generalized educational materials when the estimated stage of the user in the online shopping mission is determined to be a second, late stage, wherein the first stage is earlier in the online shopping mission than the second stage.

14. The method of claim 6, wherein adjusting the content includes displaying results of a search query having a wider array of brands of products relating to the search query when the estimated stage of the user in the online shopping mission is determined to be a first, early stage relative to results of the search query that are displayed when the estimated stage of the user in the online shopping mission is determined to be a second, late stage, the first stage being earlier in the online shopping mission than the second stage.

15. A system comprising:
a search engine configured to receive search queries from a user via a user interface;
a database configured to store historical data relating to interactions of the user with the user interface; and
a machine learning model, wherein the machine learning model includes instructions stored on one or more computer-readable storage media and executable by a processor to perform a method, the method including:
receiving signals corresponding to an online shopping mission of the user from the search engine and the database, wherein the signals include a list of events for the online shopping mission, each event corresponding to interactions of the user with the user interface during the online shopping mission;
determining an estimated stage of the user in the online shopping mission based on the signals; and
generating, for display on the user interface, content that is configured for presentation to the user, wherein the content corresponds to products relating to the online shopping mission, wherein the content is automatically adjusted based on the estimated stage of the user in the online shopping mission to be more targeted to products as the user progresses through the online shopping mission toward a latest stage of the online shopping mission, the latest stage corresponding to a selection of a targeted product for purchase by the user.

16. The system of claim 15, wherein the content is configured for presentation to a user via the user interface of an online merchant.

17. The system of claim 16, wherein each event of the list of events includes one or more parameters of an interaction of the user with the user interface, the parameters including a type of interaction and a time parameter associated with the interaction.

18. The system of claim 17, wherein the type of interaction includes one or more of a selection of a product, a text input, or a search query.

19. The system of claim 17, wherein the time parameter includes a time between events of the list of events or an acceleration between events of the list of events.

20. The system of claim 15, wherein adjusting the content comprises displaying educational material regarding a class of products relating to the online shopping mission when the estimated stage is a first, early stage, and displaying products without displaying the educational material when the estimated stage is a second, late stage, the second stage being closer to the latest stage than the first stage.

* * * * *